July 18, 1933.  W. COLINA  1,918,958

PROCESS OF UNITING MATERIALS

Filed Sept. 30, 1931

INVENTOR
William Colina
BY
ATTORNEYS

Patented July 18, 1933

1,918,958

UNITED STATES PATENT OFFICE

WILLIAM COLINA, OF WATERBURY, CONNECTICUT, ASSIGNOR TO SCOVILL MANUFACTURING COMPANY, OF WATERBURY, CONNECTICUT, A CORPORATION OF CONNECTICUT

PROCESS OF UNITING MATERIALS

Application filed September 30, 1931. Serial No. 565,996.

This invention relates to non-metallic containers such as glass bottles or vials which are commonly provided with a metal ferrule or collar to permit a closure, spray head or other device to be secured thereto. As heretofore constructed the joints between such bottles and the associated ferrules have not been entirely satisfactory, frequently leaking and sometimes permitting the ferrule to become detached.

An object of this invention is to provide a device of the type set forth constructed and arranged to have a tight compressed joint between the material of the bottle and the metal ferrule, which will not leak and will securely hold the ferrule in place.

Another object is to provide an improved method of securing a collar, ferrule or the like to a member formed from material having a lower co-efficient of expansion than the material of the collar.

These and other objects which will be apparent to those skilled in this particular art are accomplished by the invention hereinafter described with reference to the accompanying drawing in which, Fig. 1 is a view in elevation of a glass bottle or vial having a threaded metallic ferrule secured thereon in a manner hereinafter described.

Figure 1:
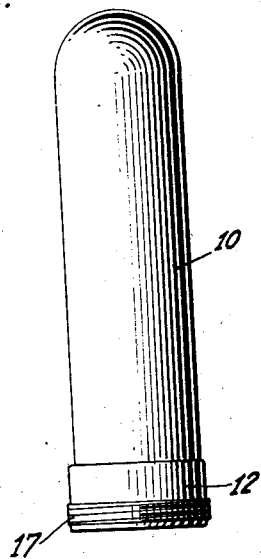
Figure 2:
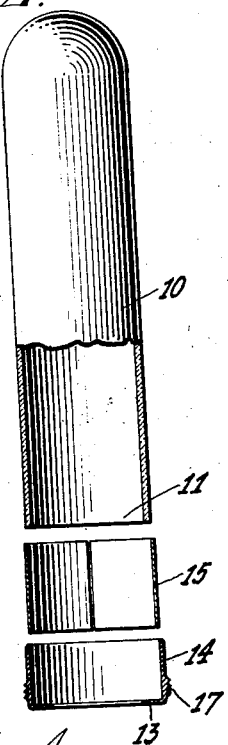
Fig. 2 is a partial sectional view showing in disassembled arrangement the different parts employed in the present invention.

The present invention contemplates a bottle formed of glass or other material having a substantially lower co-efficient of expansion than the ferrule. Mounted on the open end of the bottle is a metallic ferrule or the like secured thereto by a suitable soldering metal or the like having a relatively low melting point. The arrangement is such that the ferrule grips the bottle and the intermediate securing material with a binding force of sufficient power to prevent any leakage through the joint even when such joint is subjected to a considerable pressure.

As illustrated, the present invention is shown in connection with a glass bottle but it will be apparent that any other non-metallic material can be employed. Such a bottle 10 has its mouth 11 positioned in a metallic ferrule 12 provided with an annular flange 13 at one end of a cylindrical body 14. The inner diameter of the cylindrical body 14 is slightly greater than the external diameter of the bottle mouth 11. The latter is positioned within the ferrule so that the cylindrical wall 14 extends along the outside of the bottle mouth while the annular flange 13 extends across the bottle mouth, housing the glass of the bottle entirely within the ferrule at all points. A layer of suitable joining material such as a thin foil of soldering metal having a relatively low melting point is positioned in the space between the glass bottle and metal ferrule while all parts are cold and the amount of such material is slightly more than required to fill such space in an uncompressed condition.

Figure 3:
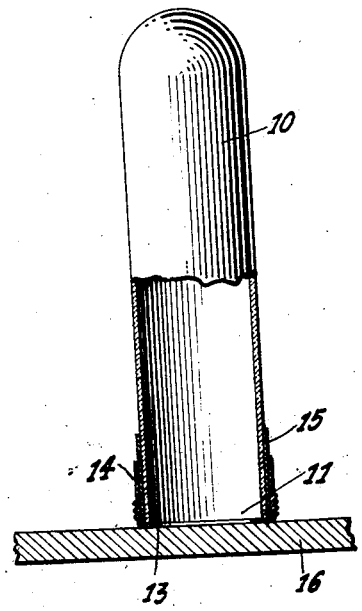
Fig. 3 is a similar view showing the parts assembled and illustrating one of the steps of the present method.
Figure 4:
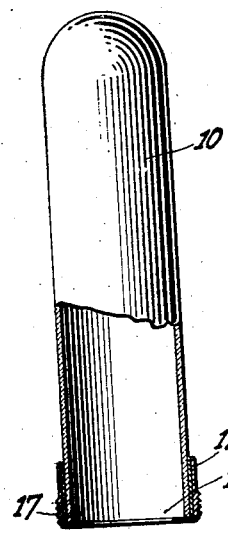
Fig. 4 is a similar view of the finished article.

As illustrated, a layer of tin 15 is positioned as described, there being sufficient tin to project beyond the end of the cylindrical body portion 14 of the metal ferrule, see Fig. 3, when the parts are originally assembled. When so assembled, the parts are positioned on a hot plate 16 or other suitable source of heat in such a way that the material of the ferrule is employed to transmit sufficient heat to the soldering metal 15 to melt the latter, the annular flange 13 and cylindrical body portion 14 co-operating to protect the glass bottle against direct application of heat. As a result of this method of heating the soldering metal, and as a result of the considerably greater co-efficient of expansion of the metal ferrule 12 over the glass bottle 10, the metal ferrule will expand relatively to the bottle increasing slightly the area of the space between the cylindrical portion 14 of the bottle. At the same time, the soldering metal, or other material, is melted and the excess flows downwardly into the space so as to substantially fill the space between the bottle and the ferrule. The parts are then removed from the hot plate and allowed to cool, during which operation the soldering metal sets and the ferrule 12 contracts upon the soldering metal and glass bottle with a compressive binding force.

As a result of this arrangement a fluid tight joint is provided which, on small glass vials, will withstand a pressure of approximately fifteen pounds per square inch without leaking. The ferrule is firmly secured to the bottle and will not become detached therefrom. Any suitable form of closure, spray head or the like can be attached to the ferrule 12, which, in the illustrated embodiment, is provided with suitable threads 17 for that purpose.

It should be understood that by the term "ferrule" as used herein, I mean to describe any collar, ring or similar device.

I claim as my invention:

1. The method of securing a metal ferrule to a glass tube which comprises positioning the end of said tube within said ferrule, inserting a ring of soldering metal around said tube within said ferrule, heating the same to expand said ferrule relatively to said tube and melting said soldering metal to fill the space between said ferrule and said tube, and then cooling the assembly to harden the soldering metal and contract said ferrule relatively to said tube to cause said ferrule to press said metal against said glass.

2. The method of securing a flanged metal ferrule to a glass tube comprising positioning the end of said tube within said ferrule with the flange thereof covering the end of the tube, inserting a ring of soldering metal around said tube within said ferrule, applying heat directly to the flange of said ferrule only so as to expand said ferrule relatively to said tube and enlarge the space between said ferrule and tube and to simultaneously melt said ring of solder and cause it to flow into and fill substantially the entire space with melted soldering metal, and then cooling the assembly to harden said solder to contract said ferrule relatively to said tube and cause said ferrule to press the hardened soldering metal against said tube.

3. The method of securing a collar or the like to a member formed of material having a lower coefficient of expansion than the material of said collar which comprises positioning said member within said collar, placing a quantity of soldering metal around said member in position to flow into the space between said member and collar when melted, heating the assembly to expand said collar relatively to said member and to melt simultaneously said soldering metal so as to cause the same to flow into the space between said member and said collar and provide a quantity of soldering metal in intimate contact with both said collar and said member, and then cooling the assembly to harden the soldering metal and to simultaneously contract said collar relatively to said member to cause said collar to press said metal against said member to be intimately united therewith.

WILLIAM COLINA.